ns Patent Office
2,900,513
Patented Aug. 18, 1959

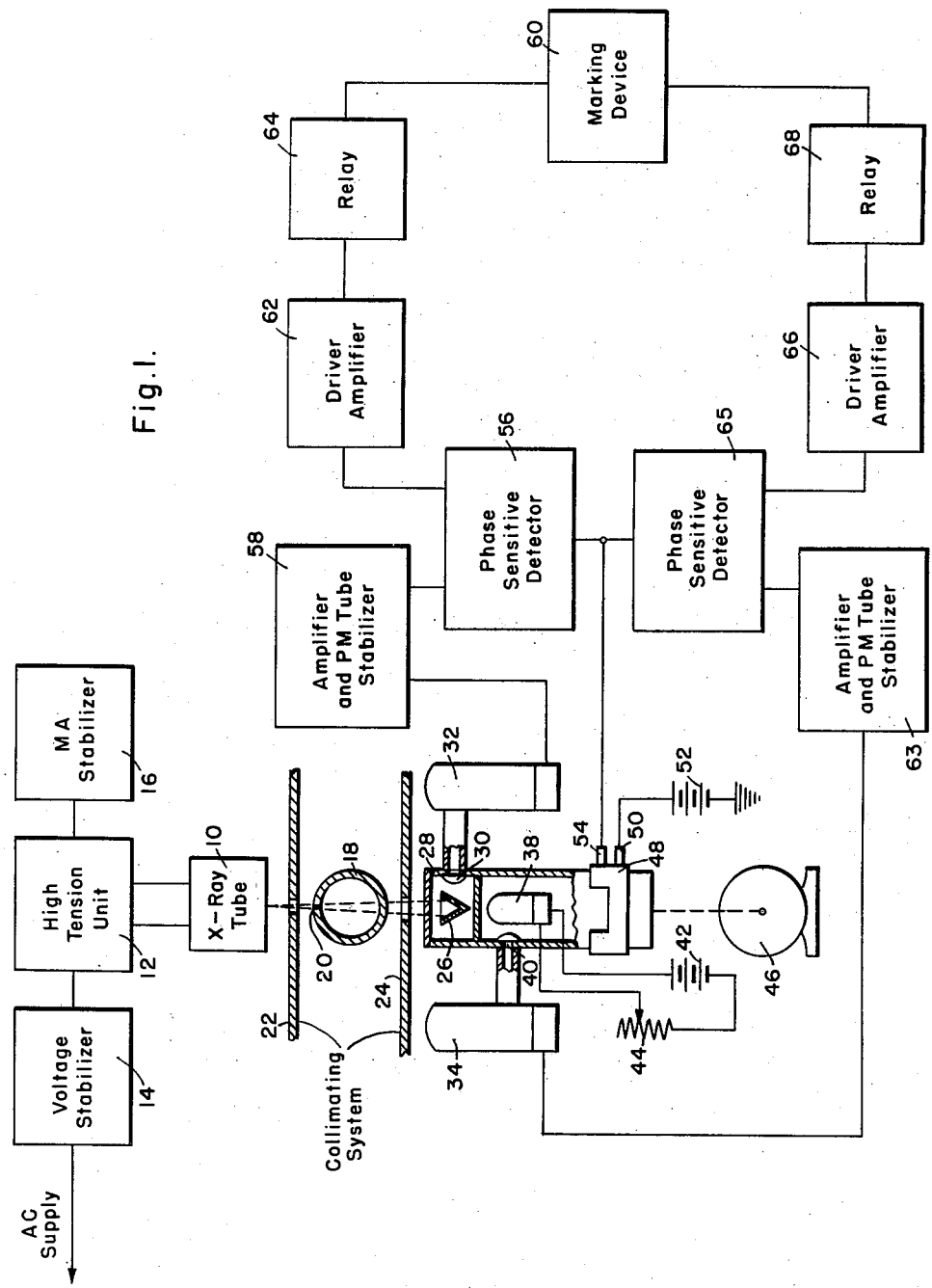

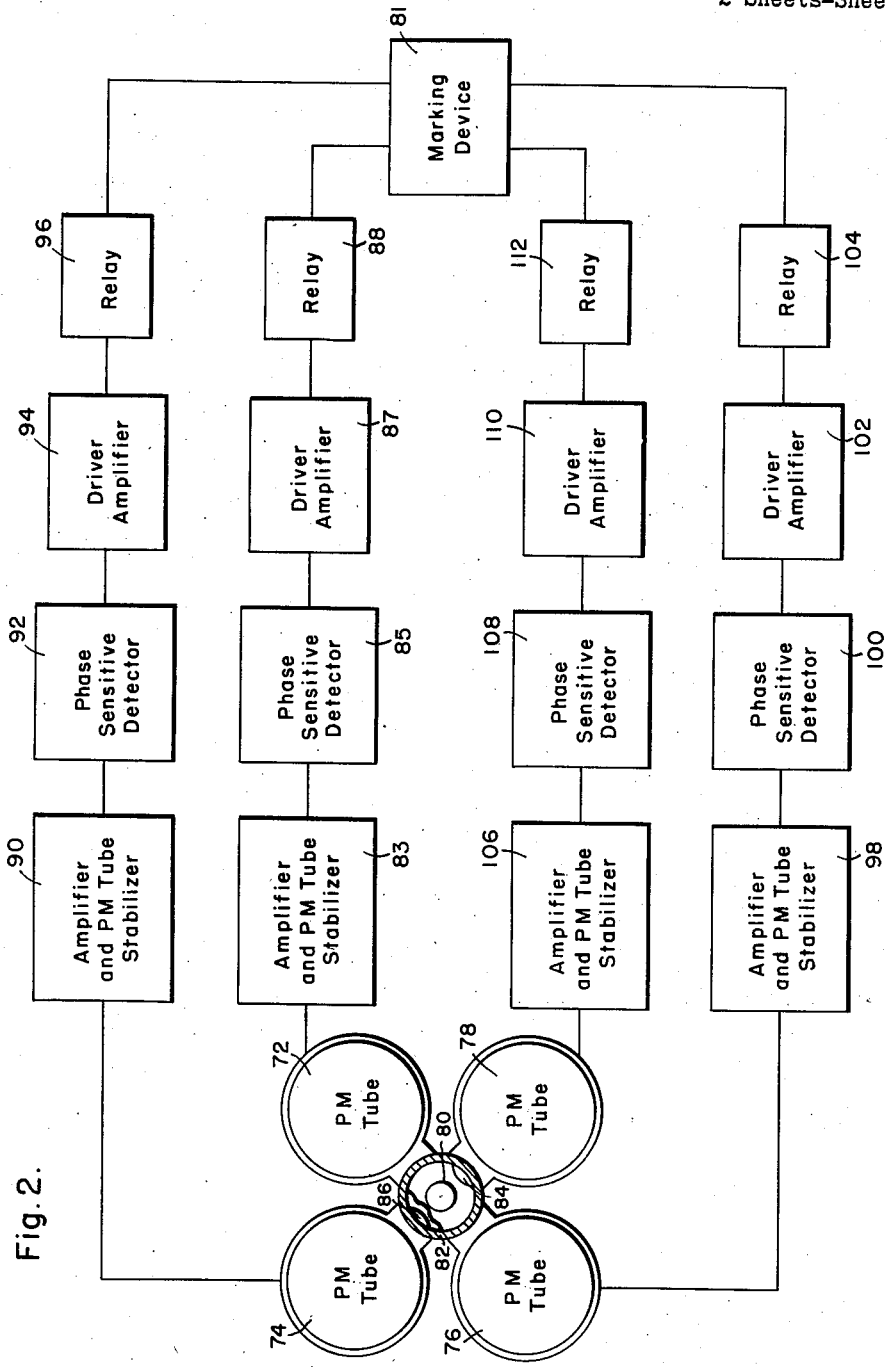

2,900,513

X-RAY APPARATUS

Philip A. Duffy, Catonsville, Md., assignor to Westinghouse Electric Corporation, East Pittsburgh, Pa., a corporation of Pennsylvania Application January 13, 1955, Serial No. 481,598

4 Claims. (Cl. 250—53)

The present invention relates to X-ray apparatus and, more particularly, to X-ray inspection or testing apparatus for determining workpiece conditions such as the thickness of a workpiece or the presence of undesirable flaws in the workpiece.

In the inspection of workpieces wherein continuous runs of workpiece material must be examined for discontinuities, flaws, thickness variations and the like, it is desirable in certain instances that the rate of workpiece inspection can be increased to correspond with the normal workpiece handling or workpiece manufacturing rates. More specifically, in the examination of the seam welds of aluminum tubing, it is practical to weld such tubing at rates of 110 to 120 feet per minute. It is important that there be no defects in the seam welds having an area in the order of 1/16 inch or greater in diameter or greater in depth than 1/2 the wall thickness. In this respect, it is further desirable that the X-ray beam used for the inspection of the seam weld be of approximately the same cross sectional area or smaller than the defect or flaw to be detected.

Accordingly, it is an object of the present invention to provide improved workpiece thicknesses or workpiece flaw inspection apparatus using X-rays or like radiation.

It is another object to provide X-ray apparatus operable for the continuous inspection of workpiece conditions at a rate capacity equal to or higher than the normal workpiece manufacturing speeds.

It is a further object to provide a less complicated X-ray inspection and testing apparatus employing an improved workpiece inspection arrangement.

It is an additional object to provide an improved X-ray inspection and testing apparatus having an increased rate of workpiece handling capacity in terms of the incremental areas of the workpiece to be covered by the apparatus.

These and other objects of the present invention will be apparent upon reading the following description taken in connection with the drawings, in which:

Figure 1 is a partial schematic and a partial sectional view of the apparatus in accordance with the present invention; and Fig. 2 is a schematic showing of a modification of the apparatus shown in Fig. 1.

In general, in accordance with the present invention, the workpiece inspection or testing rate is made considerably faster by means of a light modulator or light scanning device which can be operated at very fast speeds to successively scan one or more light responsive devices to provide a repetition rate for inspecting the incremental areas of the workpiece such that a very rapid rate of effective workpiece scanning is practical.

In Fig. 1, there is shown a source of X-rays including an X-ray tube 10 provided with the conventional high tension power supply 12 supplied energy from a suitable A.C. supply with a voltage stabilizer circuit 14 and a milliamperage stabilizer 16 circuit provided. A workpiece 18 such as a continuous section of aluminum tubing or the like having a seam weld 20 is positioned between the two shutters 22 and 24 of an X-ray collimating system, which latter collimating system is operative to confine the X-ray radiation through the workpiece to substantially a pin point beam having a cross sectional area which is substantially the same or smaller than the incremental area of the seam weld 20 to be inspected. The X-ray radiation through the seam weld 20 strikes a suitably positioned fluorescent screen 26 within a rotating light tube or light modulator 28. The fluorescent screen 26 is energized by the X-ray radiation and has a light output which is aligned with a first passage 30 in the light tube 28 to energize a photoelectric device 32, which may be a photomultiplier tube or photoelectric device including a photosensitive phosphor such as cadmium sulphide. A standard source of light 38 is provided within the light tube 28 and is positioned to expose a second photoelectric device 34 through a different passage 40 in the light tube 28. A suitable supply voltage source 42 is connected to the standard light source 38 through a variable impedance member 44. A driving motor 46 is connected to rotate the light tube 28.

A commutator 48 is provided for the light tube 28 with a first brush 50 being connected between the commutator 48 and a suitable source of potential 52. A second brush 54 is provided for the commutator 48 and is connected between a phase sensitive detector circuit 56 and the commutator 48. The output of the first photoelectric device 32 is applied to an amplifier circuit 58. The amplifier circuit may include a stabilizer circuit if the first photoelectric device 32 is of the photomultiplier type. The output of the amplifier 38 is connected to the phase sensitive detector circuit 56. The output of the latter phase sensitive detector circuit 56 is applied to a workpiece marking device 60 through a driver amplifier circuit 62 and a suitable operating or relay device 64. The output of the second photoelectric device 34 is connected to a second amplifier circuit 63, which amplifier circuit 63 may include a stabilizer circuit if the second photoelectric device 34 is of the photomultiplier type. The output of the second amplifier circuit 63 is connected to a second phase sensitive detector circuit 65 with the output of the latter phase sensitive detector circuit 65 being connected to the workpiece marking device 60 through a second driver amplifier 66 and a second operating or relay circuit 68.

In Fig. 2 there is shown X-ray inspection or testing apparatus including four photoelectric or light responsive devices 72, 74, 76 and 78, which are positioned to receive light radiation from a first light source 80 including a fluorescent screen similar to that shown in Fig. 1, and which is energized by the X-ray radiation through a suitably positioned workpiece (not shown) and is positioned within a light tube 82 having a first passage 84 for the light output of the first light source 80. The light tube 82 has a second passage 86 for the light output from a second light source, not shown, in Fig. 2, which second light source may be similar to the second light source 38 shown in Fig. 1 and operative as a standard for comparison with the light output of the first light source 80. The light tube 82 shown in Fig. 2 is similar in operation to the light tube 28 shown in Fig. 1 in this respect. The photoelectric devices 72 through 78 of Fig. 2 may be photomultiplier tube devices if desired.

The output of the first photoelectric device 72 is connected to a workpiece marking or indicating device 81 through an associated amplifier and stabilizer circuit 83, phase sensitive detector 85, driver amplifier 87 and operating device or relay 88 in a manner similar to the showing of Fig. 1. Similarly, the second photoelectric device 74 is connected to the workpiece marking device through an associated amplifier circuit 90, phase sensitive detector circuit 92, driver amplifier 94 and relay device 96. The third photoelectric device 76 is connected to the workpiece marking device through an associated amplifier circuit 98, phase sensitive detector circuit 100, driver amplifier circuit 102 and relay device 104. The fourth photoelectric device 78 is connected to the workpiece marking device through an associated amplifier circuit 106, phase sensitive detector circuit 108, driver amplifier circuit 110 and relay device 112.

In the operation of the apparatus shown in Fig. 1, the X-ray collimating system including shutter members 22 and 24 are effective to limit the X-rays passing through the workpiece 18 to a pin point beam having a cross sectional area substantially equal to or smaller than the seam weld 20 of the workpiece 18. The first light source 26 receives the X-rays which pass through the workpiece 18 and includes a fluorescent material which provides a light output for passage through the first light tube opening 30 to energize the first photoelectric device 32. Simultaneously, the light output from the standard or second light source 38 passes through the opening 40 of the light tube 28 and energizes a second photoelectric device 34. The light tube is rotated at the desired number of revolutions per minute by means of the drive motor 46 such that the first photoelectric device is alternately and successively energized by the light output of the first light source 26 through the light passage 30 and by the light output of the second light source 38 through the light passage 40 of the light tube 28. Accordingly, the electrical output of the photoelectric device 32 is in the form of alternate pulses with a first of the pulses corresponding to the light output from the first light pulse 26 and, hence, the X-ray radiation passing through the seam weld 20 of the workpiece 18 and with a second pulse corresponding to the light output from the standard light source 38. The electrical output of the first photoelectric device 32 is received by the amplifier circuit 58 and applied to a phase sensitive detector circuit 56.

The commutator 48 of the light tube 28 is operative to provide phasing information through the commutator brushes 50 and 54 and the phase voltage source 52 to the phase sensitive detector circuit 56. The commutator 48 provides phase information for synchronizing the phase sensitive detector circuit 56 with the light output from the photoelectric device 32. The latter phase sensitive detector circuit 56 is operative to compare the alternate pulses in the electrical output of the first photoelectric device 32 to provide a potential which corresponds to the difference between the respective pulse amplitudes corresponding to the light output from the first light source 26 and the light output from the standard light source 38. The comparison potential output of the phase sensitive detector is applied through the driver amplifier circuit 62 and the relay device 64 to operate a workpiece marking device 60 to give an indication on the workpiece when a predetermined condition of the workpiece has been found. Such latter condition could correspond to an undesirable flaw or undesirable thickness of the seam weld 20 which would cause the output of the first light source 26 to be at variance from the output of the standard light source 38 such that the comparison potential in the output of the phase sensitive detector circuit 56 would have an increase in magnitude as compared to a normal lower or different magnitude or a normal non-existence of such potential to thereby energize the marking device 60 to mark or provide a suitable indication relative to the workpiece that the undesirable condition was present within a predetermined portion of the workpiece 18.

The operation of the second photoelectric device 34 is similar to the operation of the first photoelectric device 32 relative to its energization of the marking device 60.

The rotating light modulator or light tube 28 is operative as a light chopper to effect an alternate energization of the photoelectric devices by, first, the light output from the first light source corresponding to the workpiece inspection or testing operation and, secondly, the light output from a standard light source 38. The rate of such scanning is very flexible and can be made to be extremely rapid in that the practical upper limit of the scansion would be a function of the upper limit of the rotational speed of the light tube 28 and a function of the travel velocity of the workpiece 18 which, in the example shown in Fig. 1, would be the longitudinal velocity of the continuous aluminum tube. Practical rotational speeds for the light tube 28 are in the order of 20,000 revolutions per minute or even higher. At the speed of 20,000 revolutions per minute and using but a single photoelectric device 32, the repetition rate of the light output received by the photoelectric device 32 would be approximately 333 pulses or exposures per second. This latter repetition rate establishes the number of incremental areas of the workpiece 18 which can be scanned per unit of time in that each of the light pulses determines the travel velocity of the workpiece 18 in terms of the incremental areas inspected by the X-ray beam projected through the workpiece.

The travel velocity of the workpiece 18 can be increased by providing two photoelectric devices which are successively scanned by the light tube 28 or by providing four photoelectric devices such as shown in Fig. 2 and one light passage 30 for the first light source or more than one light passage 30 for the first light source, such that each photoelectric device is energized at any given instant of time by only the light output from the first light source 26 or the light output from the second light source 38, but not the light outputs from both of these sources at the same time.

Practical experimentation has shown that for successive continuous scanning with the apparatus shown in Fig. 1, the travel velocity of the workpiece 18 should be at a rate corresponding to ½ of the length of the incremental area inspected per light output pulse from the first source 26 arriving at one photoelectric device. Further, a practical rate of seam welding aluminum tubing is in the order of 110 to 120 feet per minute. A practical incremental area for inspecting defects would be to reject tubing containing any flaw exceeding $\frac{1}{16}$ inch in diameter and greater than one half the thickness of the tubing wall, which may be tubing having a wall thickness of .072 inch, so the flaw thickness would be .036 inch. The marking device should indicate the defective area of the tubing, and a paint spray type of marking device would be acceptable for this purpose.

In Fig. 1, the standard light source 38 is shown as an incandescent lamp or the like. However, the standard light source 38 could if desired comprise a second fluorescent screen similar to the fluorescent screen of the first light source 26, which second fluorescent screen could be excited by radiation in a manner similar to the excitation of the first light source 26. In this respect, the fluorescent screen of the second or standard source could be excited by radiation leaving a standard sample of the same thickness and material as the workpiece 18, which latter radiation could be projected onto the second light source similarly as shown in Fig. 1 relative to the first light source. The incandescent lamp shown in Fig. 1 is suitable for particularly low sensitive applications, and a radioactive isotope source and phosphor mixture could be readily substituted for the incandescent lamp shown in Fig. 1 as the second light source 38. One advantage of providing a test sample and exciting a second fluorescent screen for the second light source 38 is the stabilization of the output signal of the phase sensitive detector 56 despite variations in the output of the X-ray tube 10.

The apparatus of Fig. 1 using the standard light source 38 in the form of an incandescent lamp is suitable for scanning a seam weld 20 having a substantially uniform cross sectional area. In applications providing a non-uniform cross sectional area, the standard light for comparison should be derived from the X-ray source 10 passing through a standard sample which corresponds in cross sectional area to the workpiece undergoing inspection and synchronized in position with the workpiece to produce a corresponding standard pulse for the variations in the cross sectional area of the workpiece.

The apparatus shown in Fig. 2 operates such that each of the photoelectric devices 72 through 78 operate through their associate circuitry to energize the marking device 80 in a manner similar to the operation of the first photoelectric device 32 and the second photoelectric device 34.

A pertinent discussion of the theory of X-ray gauging apparatus can be found in the AIEE Transactions, volume 67 for 1948 beginning at page 83 by W. N. Lundahl.

Although specific embodiments of the present invention have been shown and described, it is to be understood that still further modifications of the invention may be made without departing from the spirit and scope of the invention, for example, the two photoelectric devices shown in Fig. 1 and the four photoelectric devices shown in Fig. 2 may be changed to any reasonable and practical number of photoelectric devices and the apparatus would still be within and in accordance with the teachings of the present invention.

I claim as my invention:

1. In X-ray apparatus including an X-ray source positioned to radiate X-rays through a workpiece, the combination of a first light source positioned to receive the X-rays passing through said workpiece and having a first light output corresponding to the condition of said workpiece, a second light source having a second light output operative as a standard for comparison with said first output, a first light responsive means, a second light responsive means, a light modulation means positioned between each of said first and second light sources and said respective first and second light responsive means and being operative to alternately expose said first light responsive means respectively to said first light output and said second light output and to alternately expose the second light responsive means respectively to said first output and said second output, and workpiece marking means responsive to the first light responsive means and the second light responsive means to effect a comparison between said first light output and second light output.

2. In X-ray apparatus including an X-ray source positioned to radiate X-rays through a workpiece, the combination of a first light source including a fluorescent material positioned to receive the X-rays passing through said workpiece and having a first light output, a second light source having a second light output operative as a standard for comparison with said first light output, first photoelectric means having a first output circuit, second photoelectric means having a second output circuit, workpiece marking means connected to said first output circuit and said second output circuit, and light scanning means positioned between the first photoelectric means and said first and second light source and positioned between the second photoelectric means and the first and second light sources.

3. In X-ray apparatus including an X-ray source positioned to radiate X-rays through a workpiece and including workpiece indicating means operative to provide an indication of a predetermined condition of the workpiece, the combination of a first light source positioned to receive the X-rays passing through said workpiece and having a first light output, a second light source operative as a standard and having a second light output, a plurality of photoelectric devices with each of said photoelectric devices having an output connected to said workpiece indicating means, and light passage means positioned between each of said first and second light sources and the respective photoelectric devices and having a first passage for the first light output and a second passage for the second light output and operative to successively expose each of said photoelectric devices with respectively said first light output and said second light output.

4. In X-ray apparatus including an X-ray source positioned to radiate X-rays through a workpiece and including workpiece indicating means operative to provide an indication of a predetermined condition of the workpiece, the combination of a first light source positioned to receive the X-rays passing through said workpiece and having a first light output, a second light source operative as a standard and having a second light output, a plurality of photoelectric devices with each of said photoelectric devices having an output connected to said workpiece indicating means, and light passage means positioned between each of said first and second light sources and the respective photoelectric devices and having a first passage for the first light output and a second passage for the second light output and operative to successively expose each of said photoelectric devices with respectively said first light output and said second light output, with said light passage means including at least a rotating cylindrical light tube and with said first and second light sources being positioned within said light tube.

References Cited in the file of this patent

UNITED STATES PATENTS

| | | |
|---|---|---|
| 2,152,645 | Holven et al. | Apr. 4, 1939 |
| 2,315,287 | Holloway | Mar. 30, 1943 |
| 2,537,914 | Roop | Jan. 9, 1951 |
| 2,549,402 | Vossberg | Apr. 17, 1951 |

OTHER REFERENCES

Moriarty: "X-Ray Flicker Photometer," Gen. Elect. Rev., February 1947, pp. 39–42.

Lundahl: "X-Ray Thickness Gauge for Gold-Rolled Strip Steel," A.I.E.E. Transactions, vol. 67, 1948, pp. 83 to 90.